(12) United States Patent
Walker

(10) Patent No.: US 9,346,398 B2
(45) Date of Patent: May 24, 2016

(54) AUTOMATIC CANCELLATION MEANS FOR VEHICLE TURN INDICATOR SIGNALS

(71) Applicant: Gary Walker, Elberfeld, IN (US)

(72) Inventor: Gary Walker, Elberfeld, IN (US)

( * ) Notice: Subject to any disclaimer, the term of this patent is extended or adjusted under 35 U.S.C. 154(b) by 0 days.

(21) Appl. No.: 14/472,470

(22) Filed: Aug. 29, 2014

(65) Prior Publication Data

US 2016/0059776 A1    Mar. 3, 2016

(51) Int. Cl.
     *B60Q 1/34*      (2006.01)
     *B60Q 1/40*      (2006.01)

(52) U.S. Cl.
     CPC .......................................... *B60Q 1/40* (2013.01)

(58) Field of Classification Search
     CPC .............. B60Q 1/34; B60Q 1/40; B60Q 1/42; B60Q 1/346; B60Q 1/445
     USPC .............. 340/425.5, 465, 467, 468, 476, 477; 200/61.3, 61.31
     See application file for complete search history.

(56) References Cited

U.S. PATENT DOCUMENTS

| | | | | |
|---|---|---|---|---|
| 4,333,071 A * | 6/1982 | Kira et al. | ................ | B60Q 1/40 200/61.31 |
| 5,019,981 A * | 5/1991 | Oshita et al. | ........... | B62D 15/02 701/41 |
| 5,908,081 A * | 6/1999 | Olson | .................... | B62D 12/00 180/419 |
| 7,102,500 B2 * | 9/2006 | Martin et al. | ............ | B60Q 1/40 200/61.3 |
| 7,119,672 B2 * | 10/2006 | Subbaraman | ............ | B60Q 1/38 340/463 |
| 7,173,524 B2 * | 2/2007 | Ponziani | .................. | B60Q 1/40 340/475 |
| 7,495,549 B2 * | 2/2009 | Acres | ....................... | B62J 6/003 340/425.5 |
| 8,941,482 B1 * | 1/2015 | Gouverneur | ............. | B60Q 1/40 340/465 |
| 2007/0216403 A1 * | 9/2007 | Asano | .................. | G01D 5/2006 324/207.25 |

* cited by examiner

*Primary Examiner* — Hung T Nguyen
(74) *Attorney, Agent, or Firm* — Gary K. Price

(57) ABSTRACT

A vehicle turn signal canceling system with means to recognize that a quantified turn has been made in order to deactivate the signaling condition. The system includes a microcontroller and an inertia sensor which measures the lateral or side force created when the vehicle turns left or right. The automatic function cancels the turn based on the side force as follows: at the time the turn signal is activated, the system records the referenced lateral or side force (the "reference point"); second, when the side force exceeds the reference point, plus a pre-determined side force, the unit accumulates exceedance time; and third, when the exceedance time reaches a pre-determined period of time, the turn signal status is then changed to "cancel" and the signaling condition is deactivated.

12 Claims, 3 Drawing Sheets

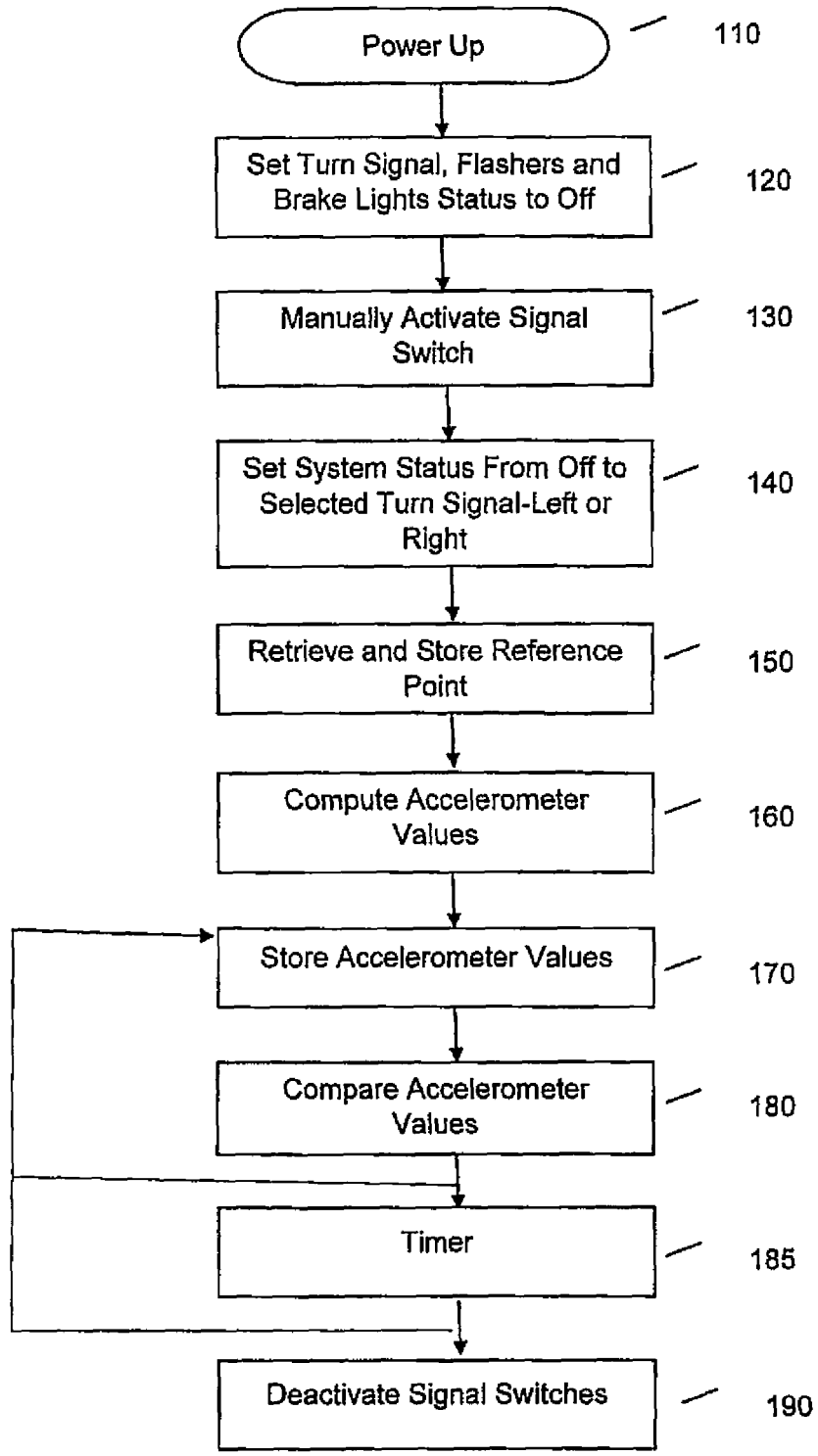

AUTOMATIC CANCELLATION MEANS FOR VEHICLE TURN INDICATOR SIGNALS

CROSS REFERENCES TO RELATED APPLICATIONS

U.S. Provisional Application for Patent No. 61/881,090, filed Sep. 23, 2013 with title "Automatic Cancellation Means for Vehicle Turn Indicator Signals" which his hereby incorporated by reference. Applicant claims priority pursuant to 35 U.S.C. Par. 119 (e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention relates generally to turn indicator signals for vehicles, and more particularly to a turn signal canceling apparatus which recognizes that a significant turn has been made and deactivates the signaling condition.

2. Brief Description of Prior Art

Vehicle turn indicator signals are generally well known in the art. Most automotive vehicles utilize turn signals which can be selectively activated by the operator to indicate a direction in which he/she intends to turn. Such signals are usually in the form of flashing light units and are controlled by switches sensitive to the turning of the steering column of the vehicle, the indicator unit remaining in its activated signaling condition while the steering wheel remains unmoved or continues to move in the direction of the turn. When the steering wheel is urged in a direction opposite the direction of the turn a mechanical catch in the steering column is released canceling the turn signal.

While the use of systems devised and utilized for the purpose of indicating a turn by a vehicle is known in the prior art, such systems consist basically of familiar, expected and obvious structural configurations, including, canceling the signal when a pre-determined distance has passed since the turn signal was activated (U.S. Pat. No. 6,204,759); canceling the signal when the vehicle's turning angle exceeds a specified degree (U.S. Pat. No. 4,660,020); canceling the signal once a pre-determined time has passed (U.S. Pat. No. 4,660,020), and canceling the signal based on changes in the gravitational and inertial forces experienced by the vehicle (U.S. Pat. No. 3,876,976). While the systems fulfill their respective, particular objective and requirements, the prior art does not disclose the structural limitations of the present invention for canceling the signal once a quantified turn has been made.

In this respect, the automatic cancellation means for vehicle turn indicator signals according to the present invention substantially departs from the conceptual concepts and designs of the prior art and in doing so provides a system developed for the purpose of canceling the signals when a quantified turn has been determined.

Therefore, it can be appreciated that there exists a continuing need for a new and improved automatic cancellation means for vehicle turn indicator signals. In this regard, the present invention substantially fulfills this need.

SUMMARY OF THE INVENTION

A vehicle turn signal canceling system with means to recognize that the vehicle has made a quantified turn and to deactivate the signaling condition. The system includes a microcontroller which during application runs multiple nested loops and reads several inputs and activates turn signal lights on all four (4) corners of a vehicle. Automatic canceling of the turn signal is done through an inertia sensor which measures the lateral or side force created when the vehicle turns left or right.

In the nested loop, the automatic function cancels the turn based on a side force. This is done with the solid state inertia sensor in a multi-step process. At the time the turn signal is activated, the system includes means for measuring the referenced lateral or side force, and beginning the automatic cancellation routine. The system continues to monitor the side force of the vehicle and includes means to change the turn signal status to "cancel," and deactivate the signaling condition at a pre-determined setting.

BRIEF DESCRIPTION OF THE DRAWINGS

FIG. 3 is a block diagram showing the first embodiment of the automatic cancellation means for vehicle indicator signals according to the present invention.

DESCRIPTION OF THE PREFERRED EMBODIMENT

The present invention is directed to a vehicle turn signal canceling apparatus for canceling the vehicle indicator signal once a quantified turn has been determined. More particularly, the present invention includes means for identifying and recording a starting or reference point when the vehicle's indicator signal is activated, and means for self-canceling the indicator signal when a series of measurements indicates that the vehicle has made a substantial change in direction determined by side forces accrued over time. In the broadest context, the vehicle turn signal canceling apparatus of the present invention consists of components configured and correlated with respect to each other so as to attain the desired objectives.

Figure 1:
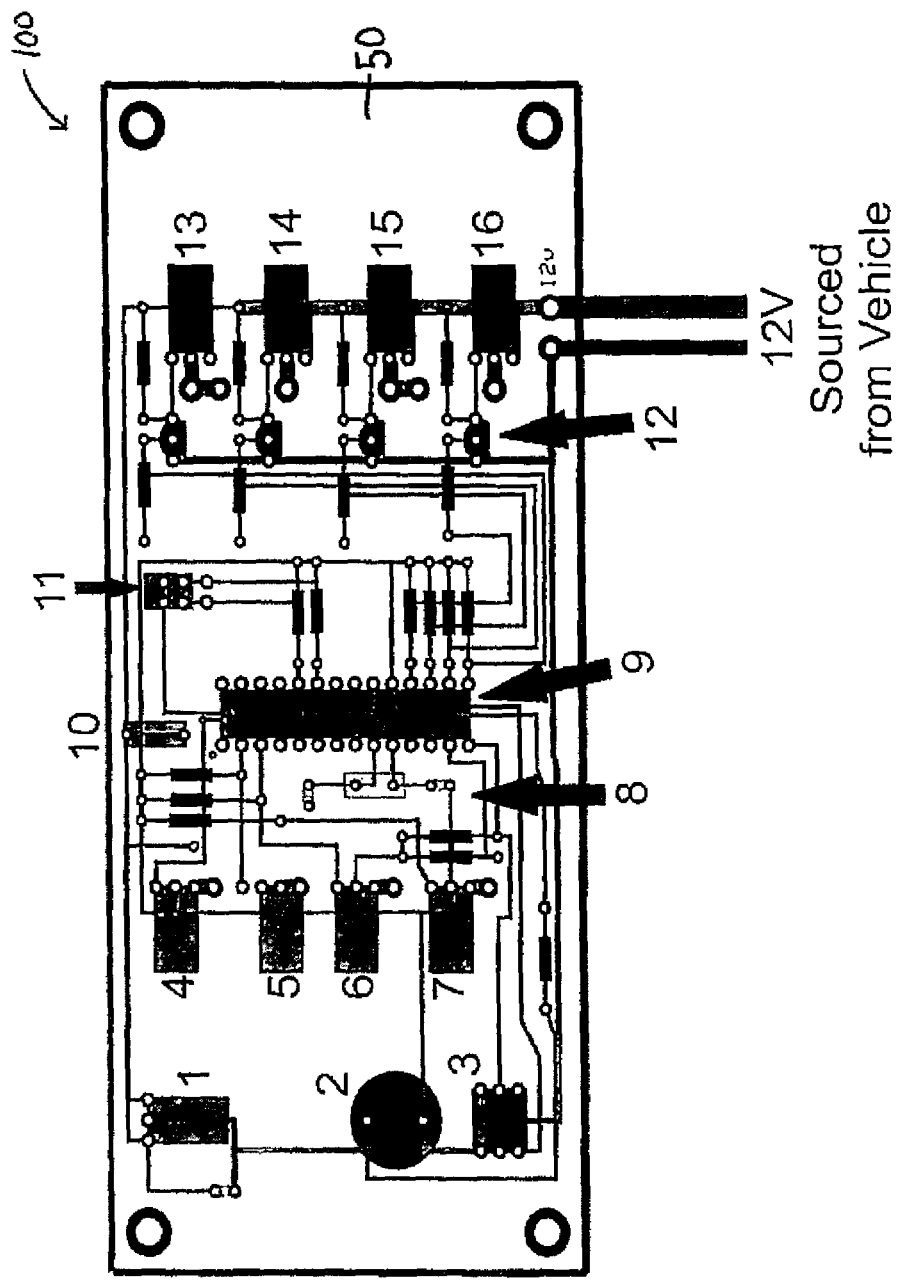
FIG. 1 illustrates a schematic diagram of an automatic cancellation means for vehicle indicator signals according to a first embodiment of the present invention.

FIG. 1 is a schematic diagram of an automatic cancellation means for vehicle indicator signals 100 according to a first embodiment of the present invention. As illustrated, the diagram discloses a board 50 having a regulated 5V circuit supply voltage 1, a Piezo Buzzer for audio feedback 2, an accelerometer for left/right force measurements 3, a flasher switch source (12V) 4, a brake switch source (12V) 5, a left turn signal switch source (12V) 6, a right turn signal switch source (12V) 7, a crystal and two capacitors to provide circuit timing reference 8, a microcontroller 9, a capacitor for voltage stabilization 10, a DIP switch 11, NPN transistors to drive power 12, transistors to drive automotive lights 13, rear right signal 14, front left signal and dash light 15, and a rear left signal 16.

Next, the operation of the automatic cancellation means for vehicle indicator signals will be described. The core of the present invention is the microcontroller 9 which during application reads several inputs and activates turn signal lights 13, 14, 15, 16, on all four (4) corners of a vehicle. The microcontroller 9 may be a microchip or other such processor. As understood, the lights can be used as turn signals, flasher or brake lights. Electric power from a voltage source 1 is supplied to the microcontroller 9, the audio feedback 2, inertia sensor 3, as well as the other components that make up the current system 100.

The cancellation of a vehicle turn can be accomplished manually or automatically. Automatic canceling of the turn signal is achieved with the inertia sensor 3 which measures the lateral or side force created when the vehicle turns left or right. The inertia sensor 3 is in communications with the microcontroller 9.

As illustrated, the board 50 defines a "Left side" and a "Right side". The board 50 is mounted within the interior of the vehicle, preferably under the vehicle's dashboard, such that the board 50 is orientated correctly so that the Left side is consistent with the left side of the vehicle, and the Right side is likewise consistent with the right side of the vehicle. It is not critical that the system 100 be strictly level; however, it is preferred that the board 50 be visually close to level when mounted.

The turn signal is activated by selecting left or right with a switch, or two (2) independent switches 6, 7. The turn signal may be activated using a button, lever, stick, or any other such device that may be engaged in order to activate the turn signal (i.e. allows a signal to be sent to the microcontroller 9). In the preferred embodiment, the turn signal is activated with a known momentary switch (not shown) electrically connected to the system 100.

The microcontroller 9 runs multiple nested loops during application. In these nested loops, the microcontroller 9 reads the status of the left and right turn switch. Activating the switch causes two (2) actions to occur. First, the status of the turn signal is updated accordingly. Second, a delay is created to allow for proper switch activation.

If the turn signal is off, and the right turn signal for example, is pressed, the status is changed from "off" to "right." If the right turn signal is again manually pressed, nothing changes. However, if the left turn signal is then pressed, the status changes from "right" to "off." Similar action occurs for using the left turn signal.

As the microcontroller 9 runs nested loops the status of the turn signal 6, 7, flasher 4 and brake light 5 is changed. In each individual circumstance, the appropriate light function is activated turning on or off lights on the front left, front right, rear left and rear right of the vehicle according to the condition. The microcontroller 9 further allows for unique mixing of the flasher and turn signal which can either be mixed or disabled by use of a dip switch 11. The dip switch 11 also allows a timer to be used to turn off the turn signal in a preset time should the auto function not cancel the turn.

In the nested loop, the automatic function cancels the turn based on the side force. This is done with the solid state inertia sensor 3. The inertia sensor 3 measures the side force of the vehicle in a multiple step process. First, the system includes means for recording the referenced side force ("reference point") at the time the turn signal is activated. When a side force measuring the reference point plus a pre-determined minimum value ("threshold") is measured, the microcontroller 9 then begins to accumulate the time of exceedance. In the preferred embodiment the pre-determined minimum value is about 0.1 g and the threshold equals the side force reference point plus the pre-determined minimum value. It is understood that the side force reference point in addition to the threshold value is the indicator that a turn is being made.

The cancel continues to accumulate exceedance time until the time has reached a pre-determined value. In the preferred embodiment, the pre-determined time value which implies a qualified turn has been made is about 1½ to 2 seconds. Once the time of exceedance has reached the time value, the microcontroller updates the turn signal status to "cancel" or "off." It being understood that the side force does not need to return to the defined reference point to cancel that signal, but when the side force exceeds the force (the reference force plus the threshold) for a specific amount of time (the pre-determined minimum value). As such, the present invention cancels when it detects a significant turn has been made, not necessarily the end of the turn.

If during a turn, a return to a forced value below the referenced exceedance subtracts time from the total exceedance time until it returns to zero. This allows for temporary exceedance caused by bumps in the roadway and uneven pavement to be nullified. Since a force below the reference exceedance is subtracted from the total exceedance time, bumps in the roadway during the vehicle's turn temporarily bringing the force below the exceedance force does not zero or nullify the accumulated time, but only subtracts from the total time. Returning to a forced exceedance in the turn again then continues to accumulate the time of the exceedance.

The side forces which cause the microcontroller to accumulate exceedance are not done by a single side force reading but a repeated exceedance which provides for a reliable reference of change.

Certain embodiments of the present invention use the measured side force of a vehicle to determine when to deactivate a turn signal indicator. For example, to make a left turn the operator manually selects the left turn signal. When the signal is manually selected, a signal is sent to the microcontroller 9, and the microcontroller stores the "reference point", as previously defined. The status of turn is changed from "off" to "left." As the vehicle turns left the sensor 3 continues to monitor the side force of the vehicle during the turn, and communicate with the microcontroller 9. When the side force measure the reference point plus the threshold, the microcontroller then begins to accumulate exceedance time. The microcontroller 9 changes the signal status to "off" once the exceedance time has reached the pre-determined time. The microcontroller 9 then deactivates the turn signal indicators of the vehicle.

In summary, the foregoing automatic turn signal canceling apparatus has the following characteristic functions: First, when the vehicle begins a turning operation and the turn signal is manually activated, the sensor 3 measures the vehicle's reference point. When the side force measures the reference point plus the threshold, the microcontroller begins to accumulate exceedance. A canceling or off signal is produced once the exceedance time has reached a pre-determined value. Thus, the lateral force detecting sensor 3 operates when the turn signal is manually inactivated, and the sensor 3 is primarily used when producing the turn canceling signal once the cancel is armed for the pre-determined period of time.

At any time during operation, the operator may manually deactivate the auto turn signal deactivator. That is, the operator may prefer to manually deactivate the turn signal. Such deactivation of the auto turn signal deactivator may be accomplished by way of the momentary switch for example, or other device that may be engaged to activate/deactivate the signal(s).

The system 100 further includes an alert 2 such as a beeping or buzzing noise, or a message on a display, to inform the operator of the system status. For example, the alert 2 begins beeping when the operator manually activates the turn signal, and cancels when the microcontroller deactivates the indicator(s).

Referring now to FIG. 3, which is a block diagram of an exemplary application of the disclosed embodiment, at 110, the system 100 is powered up from the voltage source 1. The signal indicators, the turn signals, flasher and brake lights status are set to off at 120. At 130, a turn signal is manually activated by selecting left or right switch. At 140, the system status is changed from "off" to the left or right signal selected. At 150, the inertia sensor immediately measures the side force "reference point" and determines the exceedance and stores the data with the microcontroller. The sensor continues to monitor the side force at 160 and communicate the data to the microcontroller at 170. At 180 the microcontroller compares the current side force of the vehicle with the stored exceedance. At 185 the microcontroller accumulates time for a pre-determined period. At 190 the microcontroller deactivates the turn signal indicator when current side force equals or reaches a predetermined fraction of the stored reference point. At 195, the microcontroller updates the vehicle lights, turning off the selected signal.

Thus, embodiments of the preferred embodiments of the present invention provide a means and method of automatically deactivating a turn signal indicator. In particular, certain embodiments of the present invention do not rely on a mechanical trigger to deactivate the turn signal, but relies on the vehicle's measured side force to manage automatic cancellation.

Figure 2:
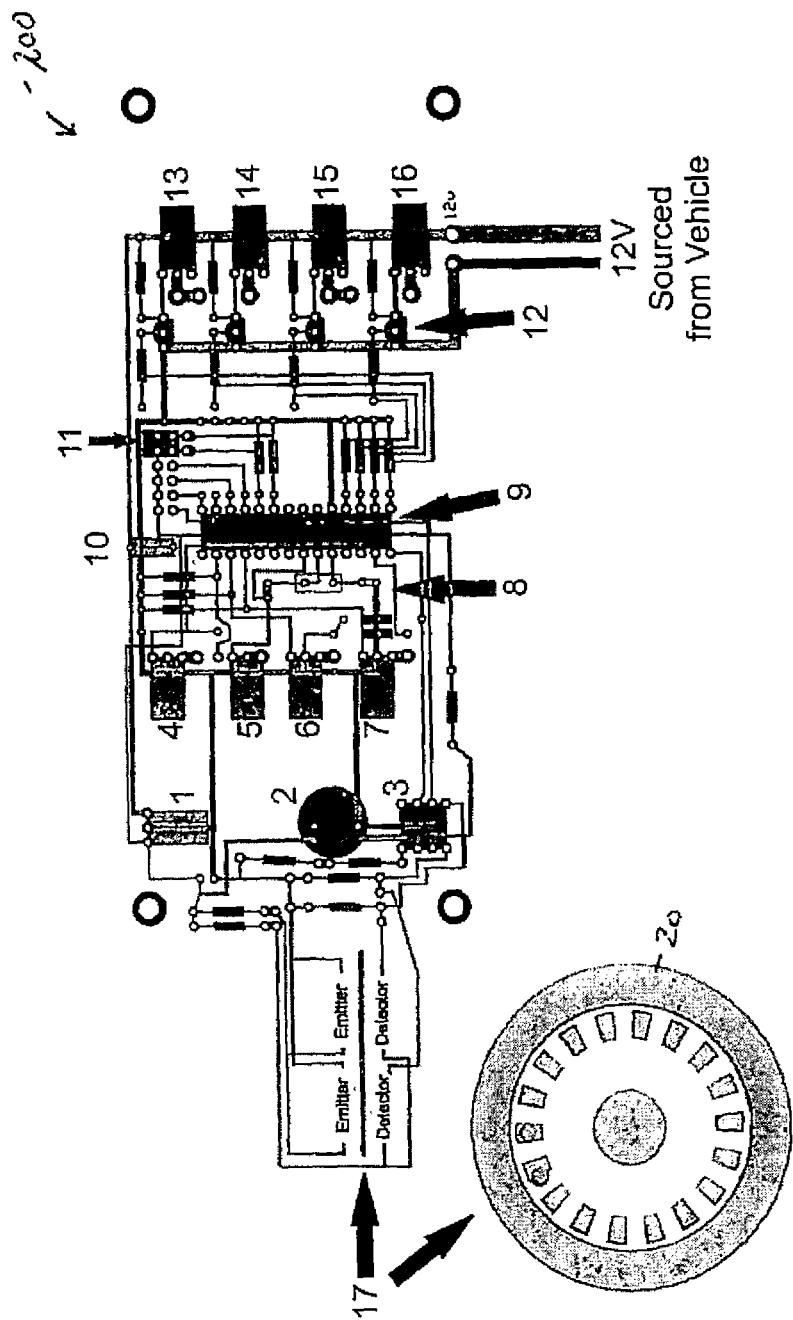
FIG. 2 illustrates a schematic diagram of an automatic cancellation means for vehicle indicator signals according to an alternate embodiment of the present invention.

FIG. 2 is a schematic diagram of an automatic cancellation means for vehicle indicator signals 200 according to a second, alternate embodiment of the present invention. The core of the invention 200 is the microcontroller 9 which during application reads several inputs and activates turn signal lights 13, 14, 15, 16, on all four (4) corners of the vehicle. As understood, the lights can be used as turn signals, flasher or brake lights.

The cancellation of a vehicle turn can be accomplished manually or automatically. Automatic canceling of the turn signal is done through the sensor 3 reading an optical encoder 17 that is attached to the steering column 20 or between the steering column and steering rack of the vehicle. The sensor 3 communicates the information retrieved from the encoder 17 to the microcontroller 9 for processing. As will be understood, the sensor 3 keeps track of the relative steering wheel position and acts accordingly in a turn.

In this embodiment, the turn signal is preferably activated with a known momentary switch (not shown) electrically connected to the system 200.

The turn signal is activated by manually selecting left or right with a switch, or two (2) independent switches 6, 7. The microcontroller 9 runs multiple nested loops during application. In these nested loops, the microcontroller 9 reads the status of the left and right turn switch. Activating the switch causes two (2) actions to occur. First, the status of the turn signal is updated accordingly. Second, a delay is created to allow for proper switch activation.

If the turn signal is off, and the right turn signal for example, is pressed, the status is changed from "off" to "right." If the right turn signal is again manually pressed, nothing changes. However, if the left turn signal is then pressed, the status changes from "right" to "off." Similar action occurs for using the left turn signal.

As the microcontroller 9 runs nested loops the status of the turn signal 6, 7, flasher 4 and brake light 5 is changed. In each individual circumstance, the appropriate light function is activated turning on or off lights on the front left, front right, rear left and rear right of the vehicle according to the condition. The microcontroller 9 further allows for unique mixing of the flasher and turn signal which can either be mixed or disabled by use of a dip switch 11. The dip switch 11 also allows a timer to be used to turn off the turn signal in the preset time should the auto function not cancel the turn.

In the nested loop, the automatic function cancels the turn based on the position of the steering wheel 20 (or steering shaft). As the steering wheel 20 moves the sensor 3 reads the optical encoder 17 attached to the steering column and then feeds the information to microcontroller 9. The encoder 17 reads the pulses from two (2) detectors 17B to determine direction and position. More particularly, the encoder 17 is attached to the steering wheel 20 through two (2) light emitters 17A and two (2) detectors 17B. The sensor 3 reads the two sensors 17A which are turned off and on by the spinning wheel 20. The encoder two (2) references 17A are out of phase, so by determining which one rises or drops, the system 200 can determine direction and keep track of position.

If the turn signal is activated to the right, the turn signal continues regardless of how far right the wheel is turned. The moment the wheel is turned back left the encoder detects the reverse position, feeds the information to the microcontroller which cancels the signal. Similar action occurs for using the left turn signal.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A system for automatically canceling a turn signal displayed on a vehicle, the system comprising:
    a board having a left side and a right side, said board disposed within an interior of a vehicle and including:
    an inertia sensor in communication with a microcontroller, said inertia sensor for measuring the vehicle's side force, wherein the microcontroller configured to record the vehicle's reference point which is the vehicle's side force at the time the vehicle's turn signal is activated and compares a force exceedance and the vehicle's current side force, said force exceedance is the vehicle's reference point plus a pre-determined minimum value, and wherein when said turn signal is activated said microcontroller is configured to incrementally accumulate an exceedance time when the vehicle's current side force exceeds said force exceedance and incrementally subtract from said exceedance time when said vehicle's current side force is below said force exceedance and wherein when said exceedance time exceeds a pre-determined value said microcontroller updates a turn signal status and cancels the vehicle's light signal.

2. The system as recited in claim 1, wherein time is incrementally subtracted from said time value when said side force experiences a temporary exceedance.

3. The system as recited in claim 1, wherein said board further includes means to activate the vehicle's light signal.

4. The system as recited in claim 3, wherein said means is a momentary switch.

5. The system as recited in claim 1, wherein said microcontroller receives electric power from a voltage source.

6. The system as recited in claim 1, wherein said board further includes an audio feedback.

7. The system as recited in claim 1, further including cancellation means in communication with the microcontroller.

8. A system for automatically canceling a light signal displayed on a vehicle, the system comprising:
- a sensor for monitoring the positioning of a vehicle's steering device by reading an optical encoder that is attached to the vehicle's steering device through two (2) light emitters and two (2) detectors and wherein each of the two (2) light emitters emit signals based upon movement of the steering device, and wherein said sensor communicates said signals to a microcontroller,
- activating the vehicle's light signal, and wherein said microcomputer configured to record a direction from said emit signals at the time the vehicle's light signal is activated, and further configured to incrementally accumulate a reference when said steering device is turned away from said direction and incrementally subtract from said reference when said steering wheel is turned towards said direction and when said reference reaches a predetermined value said microcontroller configured to update a turn signal status and deactivates the light signal.

9. The system as recited in claim 8, wherein said vehicle's light signal is activated using a momentary switch.

10. The system as recited in claim 8, further including an audio feedback.

11. The system as recited in claim 8, wherein said microcontroller receives electric power from a voltage source.

12. A process of canceling a vehicle's light signal following the vehicle's turning operation, said process comprising the following steps in the following order:
- activating a vehicle's light signal,
- determining the vehicle's reference point at the time the vehicle's light signal is activated by measuring the vehicle's current side force with an inertia sensor, said inertia sensor in communication with a microcontroller, recording said vehicle's reference point,
- calculating an exceedance force using said reference point plus a pre-determined value,
- comparing the vehicle's current side force with said exceedance force, accumulating a total exceedance time quantity when said current side force exceeds said exceedance force and subtracting from said total exceedance time quantity when said current side force is below said exceedance force, and when said total exceedance time exceeds a pre-determined time value, updating a turn signal status and canceling the vehicle's light signal.

* * * * *